June 30, 1953 — F. RONNE — 2,643,889
SKI POLE RING
Filed Nov. 22, 1949
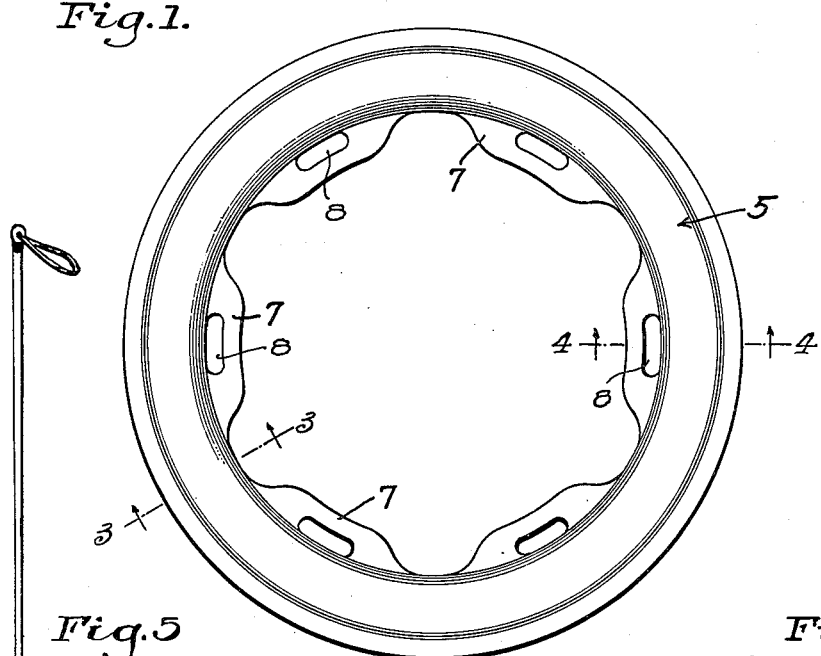
Fig. 1.
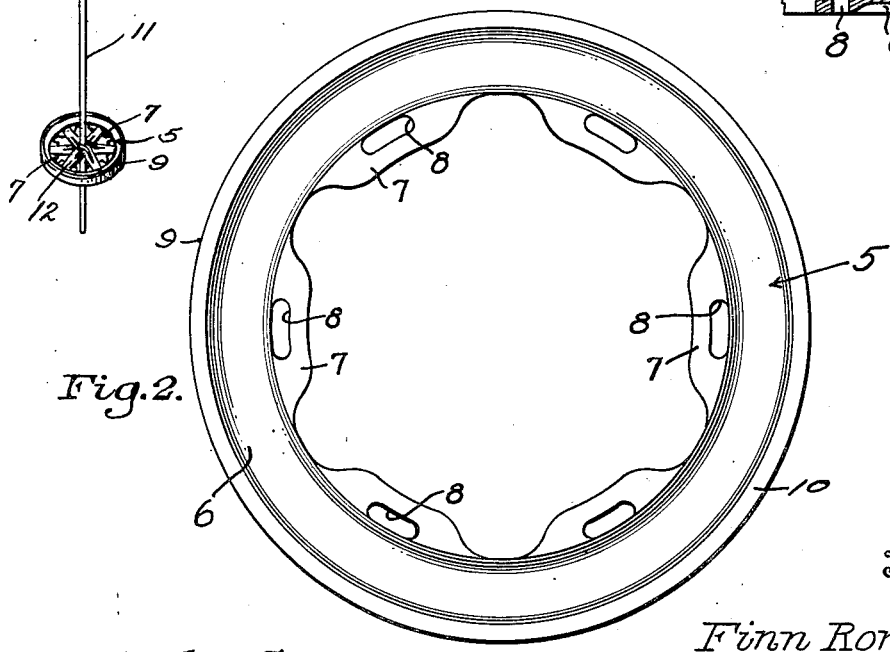
Fig. 2.
Fig. 3.
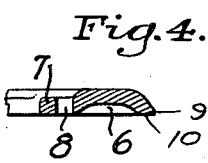
Fig. 4.
Fig. 5.
Inventor
Finn Ronne
ATTORNEY Patented June 30, 1953

2,643,889

UNITED STATES PATENT OFFICE 2,643,889

SKI POLE RING

Finn Ronne, Chevy Chase, Md.

Application November 22, 1949, Serial No. 128,898

2 Claims. (Cl. 280—11.37)

(Granted under Title 35, U. S. Code (1952), sec. 266)

The invention described herein, if patented, may be manufactured and used by or for the Government for governmental purposes without the payment to me of any royalty thereon.

This invention relates to ski pole rings. Among other objects, the invention provides a ring which has an exceptionally high strength-weight ratio; which may be pure white without painting or other surface treament; which may be manufactured by automatic machinery and from non-strategic materials; which will not rust or corrode or rot; which is a poor conductor of heat, hence will not absorb heat from the rays of the sun (as metal rings do) and then melt snow lying thereon to cause the formation of ice from the frozen snow water, in temperatures below the freezing point. Other objects will appear from the following description of the preferred embodiment of the invention shown in the accompanying drawings wherein Fig. 1 is a top plan view;

Fig. 2 is a bottom plan view;

Figs. 3 and 4 are cross sections respectively on lines 3—3 and 4—4 of Fig. 1;

Fig. 5 is a perspective view of the ring shown attached to a ski pole.

The improved ski pole ring is made from glass fibers and a resin with or without the addition of asbestos fibers and glass cloth. A satisfactory ring was made by employing matched dies and charging the mold with a compound as follows:

| | Per cent by weight |
|---|---|
| Chopped glass fibers | 45 |
| Asbestos fibers | 10 |
| Resin (including catalyst) | 45 |
| | 100 |

The resin was an alkyd resin (98.5% by weight) and a catalyst or oxidizing agent (1.5% by weight). The charge weighed 0.28 lb. Molding pressure was 1000 p. s. i. and the curing time was three minutes in the press, at a temperature of 250° F. One ply of H. G. 64 "Fiberglass" cloth, Finish 114, was used for the upper face of the ring, but this was unnecessary. The ring made as described had an outside diameter of about seven inches, a width at the narrowest points of about 1⅜ in., a maximum width of about 1¾ in., and weighed about four ounces.

In general, the resins which can be used satisfactorily to make ski pole rings are high impact type thermosetting resins having low moisture-absorption characteristics, and good impact strength at —65° F. Examples of such resins are the class known as polyesters, of which alkyd plus styrene polymer is a good example. Some phenolformaldehyde and melamine-formaldehyde resins are also satisfactory. In some cases the polymerization takes place exothermically while in other cases heat must be supplied. Temperatures range from room temperature to 310° F. and pressures from atmospheric pressure to 1000 p. s. i. or more.

Besides matched steel dies, molding may be accomplished by using a rubber bag or diaphragm to apply low pressure to one surface of the charge while the other surfaces take the shape of the mold, or the molding may be without any pressure at all, and in the latter case a room temperature catalyst is often used. A white pigment may be incorporated in the mix prior to the molding so that the completed ring is white enough to be scarcely distinguishable against a background of snow.

The preferred form of ski pole ring made in accordance with one of the procedures outlined above is an annulus 5 having a shallow annular depression or channel 6 on the underside and having a plurality of integral fins 7 on the inner periphery, all the fins lying in the same plane with their bottom surfaces in the same plane as the bottom surfaces of the annulus. These fins have a thickness slightly greater than one-half the over-all thickness of the annulus. Preferably there are six fins arranged equal distances apart and each has an elongated slot 8 to receive a strap 12, three straps being used to flexibly secure the ring to the ski pole 11. The depression or channel 6 does not extend all the way out to the circular edge 9 of the ring, but is surrounded by a narrow annular flat surface 10 which gives the edge 9 sufficient strength to resist chipping or nicking. However, edge 9 is sufficiently sharp to have a cutting or penetrating action on hard snow surfaces. This is of considerable practical importance as the skier has much better control of his skis, sidewise slipping being prevented when traveling on the side of but not straight down a hill.

Having described the invention what I claim is:

1. A molded ski pole ring consisting of a metal-free, rigid annulus having a shallow annular channel on the underside with a narrow annular flat surface surrounding the channel, a circular edge bounding the narrow annular flat surface on the outside and acting as a cutting edge to give a gripping action on hard snow, a plurality of flat fins molded integrally with the annulus and each extending a very short distance inwardly thereof on its inner periphery, each fin having a thickness substantially less than the over-all thickness of the annulus and having its bottom plane in the same plane as the bottom surfaces of the annulus, each fin having an elongated straight slot extending from top to bottom and adapted to receive a strap to secure the ring flexibly to a ski pole.

2. A molded ski pole ring consisting of a metal-free, rigid annulus having a shallow annular channel on the underside with a narrow annular flat surface surrounding the channel, a circular edge bounding the narrow annular flat surface on the outside and acting as a cutting edge to give a gripping action on hard snow, a plurality of flat fins molded integrally with the annulus and each extending a very short distance inwardly thereof on its inner periphery, each fin having its bottom surface in the same plane as the bottom surfaces of the annulus and having a slot extending from top to bottom and adapted to receive a strap to secure the ring flexibly to a ski pole.

FINN RONNE.

References Cited in the file of this patent

UNITED STATES PATENTS

| Number | Name | Date |
| --- | --- | --- |
| 2,133,183 | Baird et al. | Oct. 11, 1938 |
| 2,255,313 | Ellis | Sept. 9, 1941 |
| 2,460,795 | Warrick | Feb. 1, 1949 |
| 2,528,606 | Pedersen | Nov. 7, 1950 |
| 2,560,498 | Warrick | July 10, 1951 |

FOREIGN PATENTS

| Number | Country | Date |
| --- | --- | --- |
| 61,348 | Norway | Aug. 21, 1939 |
| 116,283 | Australia | Dec. 11, 1942 |
| 138,039 | Austria | June 25, 1934 |
| 181,563 | Switzerland | Mar. 2, 1936 |